/ Patented Dec. 5, 1939

UNITED STATES PATENT OFFICE 2,182,055

AZO DYESTUFF HEAVY METAL COMPLEX COMPOUNDS

Hugo Schweitzer, Leverkusen-Wiesdorf, Germany, assignor to General Aniline Works, Inc., New York, N. Y., a corporation of Delaware No Drawing. Application March 11, 1935, Serial No. 10,587. In Germany March 17, 1934

10 Claims. (Cl. 260—147)

The present invention relates to azo dyestuff heavy metal complex compounds; more particularly it relates to dyestuffs which may be represented by the probable general formula:

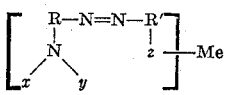

wherein R stands for the radical of a diazotization component, R' stands for an azo dyestuff coupling component which may bear azo groups, $x$ and $y$ stand for hydrogen, alkyl, aralkyl, aryl or acyl, $z$ stands for hydroxyl or the amino group, the grouping

and the letter $z$ standing in o-position to the azo-bridge, and Me stands for a heavy metal, such as chromium, iron and copper.

The heavy metal complex compounds of azo dyestuffs known up to the present are generally derived from azo compounds obtained by coupling diazotized aromatic o-aminohydroxy- or o-aminocarboxy compounds with coupling components containing a hydroxy or an amino group in o-position to the coupling position.

In accordance with the present invention new heavy metal complex compounds of azo dyestuffs of the above-identified formula are prepared by treating with an agent yielding a heavy metal, in substance or on the fibre, azo compounds containing in the radical of the diazo compound used in the process of manufacture in o-position to the azo group an amino group, in which amino group the hydrogen atoms can be substituted in any manner by alkyl-, aralkyl-, aryl- or acyl-groups.

The starting azo compounds used in the present process are obtainable according to various methods. Thus, for example, azo compounds can be employed obtained by coupling diazo compounds containing in o-position to the diazo group an amino group, both hydrogen atoms of which are substituted by alkyl, aralkyl, aryl or acyl groups, with suitable coupling components or by coupling diazo compounds containing in o-position to the azo group a nitro group with suitable coupling components, and transforming the nitro group into the amino group according to methods known per se (compare French Patent No. 773,238).

The water soluble azo dyestuffs obtained in accordance with the new process generally yield dyeings of very good fastness properties, while those insoluble in water are valuable pigments.

The invention is illustrated by the following examples, without being limited thereto:

*Example 1.*—38.7 parts by weight of the dyestuff 1-methyl-3-aminobenzene-4-azo-1-(4'-sulfophenyl)-3-methyl-5-pyrazolone, obtainable by coupling diazotized 1-methyl-3-nitro-4-aminobenzene with 1-(4'-sulfophenyl)-3-methyl-5-pyrazolone and reducing the nitro group to the amino group by the process described in French Patent No. 773,238, are heated in 600 parts by weight of water with a chromium formate solution corresponding to 9.5 parts by weight of $Cr_2O_3$ for 4 hours at 130° C. The chromium compound crystallized after cooling is filtered with suction, washed, transformed into the sodium salt and dried. The dyestuff having in the free state the following formula:

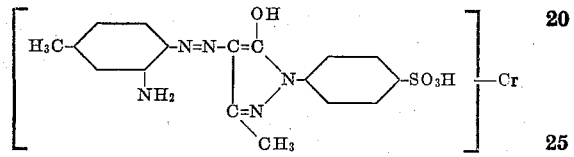

is obtained in the form of a yellowish powder, dyeing wool from an acid bath very level brownish-yellow shades of very good fastness properties.

By substituting the 1-(4'-sulfophenyl)-3-methyl-5-pyrazolone by other pyrazolones there are obtained dyestuffs of similar properties.

*Example 2.*—54.2 parts by weight of the dyestuff 1-methyl-3-acetylaminobenzene-4-azo-1-(2'-naphthyl-4'.8'-disulfo)-3-methyl-5-pyrazolone, obtainable by coupling diazotized 1-methyl-3-nitro-4-aminobenzene with the 3-methyl-5-pyrazolone from 2-naphthylamine-4.8-disulfonic acid, reducing the nitro group by the process used in Example 1 and acetylating the amino group formed, are heated with chromium formate as described in Example 1. The chromium compound crystallized after cooling is filtered with suction, washed with water and transformed into the sodium salt. The dyestuff having in the free state the following formula:

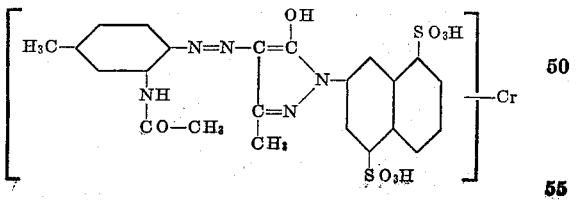

dyes wool from an acid bath very level fast yellowish-brown shades.

The starting dyestuff free from chromium dyes wool from an acid bath orange shades which when after-chromed turn to an even yellowish brown of very good fastness properties. The same shade is obtained by performing the dyeing and chroming from a single bath.

*Example 3.*—46.9 parts by weight of the dyestuff 1-methyl - 3 - benzoylaminobenzene-4-azo-1-(3'-sulfophenyl)-3-methyl-5-pyrazolone, obtainable by coupling diazotized 1-methyl-3-nitro-4-aminobenzene with 1-(3'-sulfophenyl)-3-methyl-5-pyrazolone, reducing the nitro group by the process used in Example 1 and benzoylating the amino group formed, are heated with chromium formate as described in Example 1. The chromium compound crystallized after cooling is filtered with suction, washed and transformed into the sodium salt. The dyestuff having in the free state the following formula:

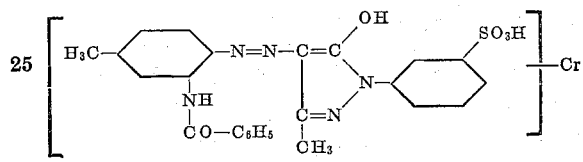

dyes wool from an acid bath even reddish-yellow shades of good fastness properties.

*Example 4.*—54.1 parts by weight of the dyestuff 1 - methyl-3-toluenesulfonylaminobenzene-4-azo-1-(2'-sulfophenyl) - 3 - methyl-5-pyrazolone, obtainable by coupling diazotized 1-methyl-3-nitro-4-aminobenzene with 1-(2'-sulfophenyl)-3-methyl-5-pyrazolone, reducing the nitro group to the amino group by the process used in Example 1 and p-toluenesulfonating the same, are heated with chromium formate as described in Example 1. The dyestuff crystallized after cooling is filtered, washed, transformed into the sodium salt and dried. The dyestuff having in the free state the following formula:

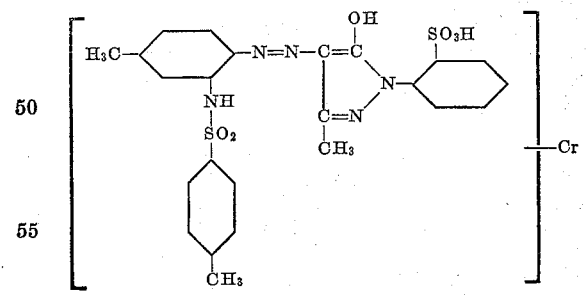

dyes wool from an acid bath even orange shades of very good fastness properties.

*Example 5.*—21.6 parts by weight of 1-dimethylamino-2-aminobenzene-4-sulfonic acid are diazotized in the usual manner with 6.9 parts by weight of sodium nitrite in the presence of hydrochloric acid. The yellow diazo solution is then poured into an alkaline reacting aqueous suspension prepared from 14.4 parts by weight of β-naphthol. When the coupling is complete, the dyestuff is salted out and worked up in the usual manner. It dyes wool from an acid bath red shades which on after-chroming turn to a Bordeaux of good fastness properties.

The chromium complex compound prepared in substance by refluxing the dyestuff above specified with chromium formate dyes wool from an acid bath fast reddish-violet shades. The dyestuff corresponds in the free state to the following formula:

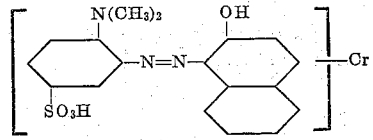

The 1-dimethylamino-2-aminobenzene-4-sulfonic acid is obtainable from 1-chloro-2-nitrobenzene-4-sulfonic acid by replacement of the chlorine atom with dimethylamine and reducing the nitro group of the 1-dimethylamino-2-nitrobenzene-4-sulfonic acid formed.

*Example 6.*—43.3 parts by weight of the dyestuff 2-aminobenzene-4-sulfonic acid-1-azo - β - naphthol, obtainable by coupling diazotized 2-nitro-1-aminobenzene-4-sulfonic acid with β-naphthol and reducing the nitro group by the process used in Example 1, are heated as described in Example 1 with chromium formate. The dyestuff crystallizing on cooling is filtered with suction, washed and transformed into the sodium salt. The dyestuff having in the free state the following formula:

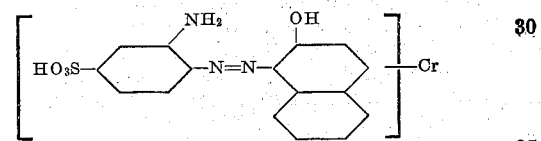

dyes wool from an acid bath even brownish-red shades of good fastness properties.

*Example 7.*—51.1 parts by weight of the p-toluenesulfo compound of the dyestuff 1-methyl-3-aminobenzene-4-azo-1-naphthol-4-sulfonic acid, obtainable by coupling diazotized 1-methyl-3-nitro-4-aminobenzene with 1-naphthol-4-sulfonic acid, reducing the nitro group by the process used in Example 1, and toluenesulfonating the amino group formed, are heated with chromium formate as described in Example 1. The dyestuff crystallizing on cooling is filtered, washed, transformed into the sodium salt and dried. In the free state it corresponds to the following formula:

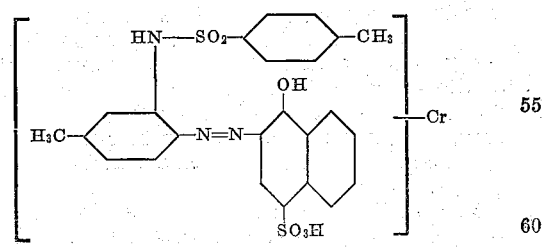

and dyes wool from an acid bath violet shades of good fastness properties.

*Example 8.*—43.7 parts by weight of the dyestuff 1-methyl-3-aminobenzene-4-azo-1-naphthol-3.7-disulfonic acid, obtainable by coupling diazotized 1-methyl-3-nitro-4-aminobenzene with 1-naphthol-3.7-disulfonic acid and reducing the nitro group by the process used in Example 1, are heated with chromium formate as described in Example 1. The dyestuff formed crystallizes on cooling; it is filtered, washed, transformed into the sodium salt and dried. From an acid bath it dyes wool even reddish-violet shades of good fastness properties. In the free state the dyestuff corresponds to the following formula:

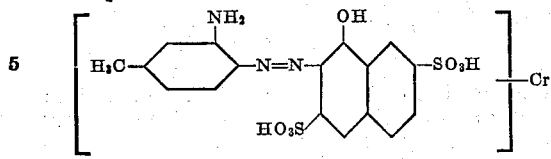

The following table sets out some further dyestuffs prepared in accordance with the present process and the shades obtained therewith; in this table:

(a) Means the dyeing on wool with the chromium complex compound of the dyestuff prepared in substance.
(b) Means the after-chromed dyeing on wool with the dyestuff free from chromium.
(c) Means the dyeing on wool with the iron complex compound of the dyestuff prepared in substance.
(d) Means the coloration of the zapon lacquer of the iron complex compound of the dyestuff.

dyes wool from an acid bath yellow shades of good fastness properties.

I claim:

1. Azo dyestuff heavy metal complex compounds of the general formula:

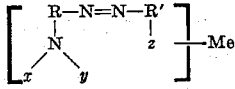

wherein R stands for the radical of a diazotization component of the benzene series, R' stands for the radical of an azo dyestuff coupling component, $x$ and $y$ stand for a member of the group consisting of hydrogen, alkyl, and acyl, $z$ stands for a member of the group consisting of the hydroxy and the amino group, the grouping

and the letter $z$ standing in o-position to the azo-

|  | Initial component | Coupling component |
|---|---|---|
| 1 | 1-methyl-3.4-diaminobenzene | 1-(3'-sulfophenyl)-3-methyl-5-pyrazolone. (a) Brownish-yellow. (b) Yellowish-brown. |
| 2 | 1-methyl-3-p-toluenesulfamino-4-aminobenzene | 1-(2'-chloro-4'-sulfophenyl)-3-methyl-5-pyrazolone. (a) Reddish-brown. (b) Orange brown. |
| 3 | 1-chloro-3.4-diaminobenzene | 1-(4'-sulfophenyl)-3-methyl-5-pyrazolone. (a) Orange brown. (b) Reddish-brown. |
| 4 | 1-methyl-3-p-toluenesulfamino-4-aminobenzene | 1-methylpyrazolone from 2-naphthylamine-4.8-disulfonic acid. (a) Reddish-orange. (b) Reddish-orange. |
| 5 | 1-sulfo-3.4-diaminobenzene | 1-phenyl-3-methyl-5-pyrazolone. (a) Reddish-yellow. (b) Yellow. |
| 6 | 1-sulfo-3.4-diaminobenzene | Aceto-acetic anilide. (a) Yellow. (b) Yellow. |
| 7 | 1.2-diaminobenzene | 1.8-dihydroxynaphthalene-3.6-disulfonic acid. (a) Blue. |
| 8 | 1-methyl-3-acetylamino-4-aminobenzene | 1-naphthol-4-sulfonic acid. (a) Violet. (b) Violet. |
| 9 | 1-methyl-3.4-diaminobenzene | 1-naphthol-5-sulfonic acid. (a) Violet. (b) Violet. |
| 10 | 1-ethoxy-3.4-diaminobenzene | 2-acetylamino-8-naphthol-6-sulfonic acid. (a) Violet. (b) Violet. |
| 11 | 1-methyl-3.4-diaminobenzene | 1-naphthol-3.6-disulfonic acid. (a) Reddish-violet. (b) Violet. |
| 12 | 1-sulfo-3.4-diaminobenzene | p-cresol. (a) Violet. (b) Violet. |
| 13 | 1-methyl-3-acetylamino-4-aminobenzene | 1-naphthol-3.7-disulfonic acid. (a) Reddish-violet. (b) Reddish-violet. |
| 14 | 1-methyl-3-p-toluenesulfamino-4-aminobenzene | Do. (a) Violet. (b) Violet. |
| 15 | 1-methyl-3.4-diaminobenzene | 1-(2'-chloro-4'-sulfophenyl)-3-methyl-5-pyrazolone. (c) Brown. |
| 16 | 1-methyl-3.4-diaminobenzene | 1-phenyl-3-methyl-5-pyrazolone. (d) Brown. |

*Example 9.*—21.6 parts by weight of 1-dimethylamino-2-aminobenzene-4-sulfonic acid are diazotized in the usual manner with 6.9 parts by weight of sodium nitrite in the presence of hydrochloric acid. The yellow diazo solution is then poured into an alkaline reacting aqueous suspension prepared from 18 parts by weight of 1-phenyl-3-methyl-5-pyrazolone. The dyestuff is transformed into its chromium complex compound according to the directions given in Example 1. The dyestuff having in the free state the following formula:

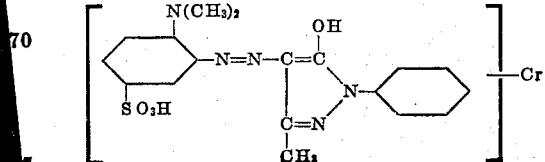

bridge, and Me means a heavy metal, those bearing a solubilizing group generally yielding dyeings of very good fastness properties, while those insoluble in water are valuable pigments.

2. Azo dyestuff heavy metal complex compounds of the general formula:

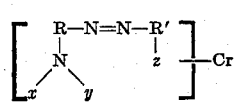

wherein R stands for the radical of a diazotization component of the benzene series, R' stands for the radical of an azo dyestuff coupling component, $x$ and $y$ stand for a member of the group consisting of hydrogen, alkyl, and acyl, $z$ stands for a member of the group consisting of hydroxy and the amino group, the grouping

and the letter z standing in o-position to the azo-bridge, those bearing a solubilizing group generally yielding dyeings of very good fastness properties, while those insoluble in water are valuable pigments.

3. Azo dyestuff heavy metal complex compounds of the general formula:

wherein R stands for the radical of an aromatic diazotization component, R' stands for the radical of an azo dyestuff coupling component, and z stands for a member of the group consisting of hydroxy and the amino group, and wherein the molecule bears at least one sulfonic acid group, yielding dyeings of very good fastness properties.

4. Azo dyestuff heavy metal complex compounds of the general formula:

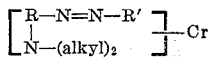

wherein R stands for the radical of an aromatic diazotization component and R' stands for a pyrazolone coupling component, and wherein the molecule bears at least one sulfonic acid group, yielding generally yellow dyeings of very good fastness properties.

5. The dyestuff having in the free state the following formula:

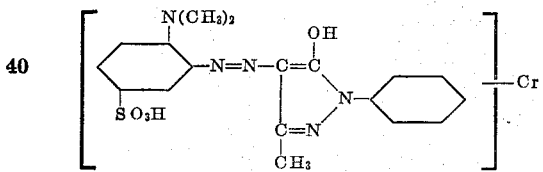

dyeing wool from an acid bath yellow shades of good fastness properties.

6. Azo dyestuff heavy metal complex compounds of the general formula:

wherein R stands for the radical of a diazotization component of the benzene series, R' stands for the radical of an azodyestuff coupling component, and R" stands for a radical of the benzene series, and wherein the molecule bears at least one sulfonic acid group, yielding dyeings of very good fastness properties.

7. Chromiferous monoazo dyestuffs of the general formula

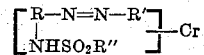

wherein R stands for the radical of a diazotized aromatic amine of the benzene series containing the —NHSO₂R″ group in a position ortho to the azo group, R″ represents a radical of the benzene series and R' represents a radical of an azo dyestuff coupling component containing a hydroxy group, wherein the coupling takes place ortho to said hydroxy group, and wherein the molecule bears at least one sulfonic acid group, said chromiferous dyestuffs being water-soluble and capable of yielding dyeings of good fastness.

8. Water-soluble chromiferous monoazo dyestuffs having the general formula

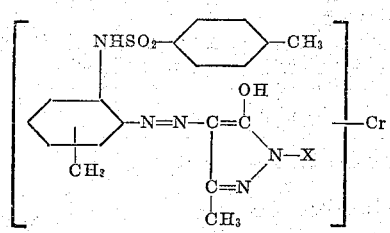

wherein X represents a sulfo-benzene nucleus.

9. Water-soluble chromiferous monoazo dyestuffs having the general formula:

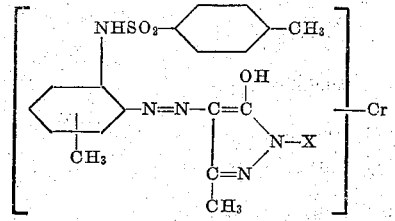

wherein X represents a p-sulfo-benzene nucleus containing chlorine therein.

10. Water-soluble chromiferous monoazo dyestuffs having the general formula

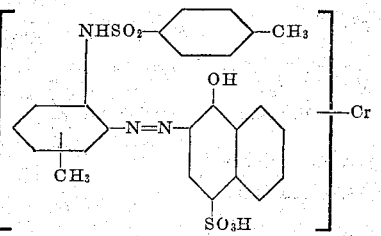

HUGO SCHWEITZER.